United States Patent [19]

Ford

[11] 4,021,507

[45] May 3, 1977

[54] POLYESTER ELASTOMERIC PARTICLES

[75] Inventor: David Norman Ford, E. Doncaster, Australia

[73] Assignee: ICI Australia Limited, Australia

[22] Filed: Oct. 15, 1974

[21] Appl. No.: 515,019

[30] Foreign Application Priority Data

Nov. 2, 1973  Australia .......................... 5515/73

[52] U.S. Cl. .......................... 260/873; 204/159.15; 204/159.19; 260/16; 260/22 CB; 260/835; 260/842; 260/850; 260/857 PE

[51] Int. Cl.² .......................................... C08L 67/06

[58] Field of Search ............... 260/873; 204/159.15

[56] References Cited

UNITED STATES PATENTS

| | | | |
|---|---|---|---|
| 3,268,622 | 8/1966 | Stanton et al. | 260/873 |
| 3,274,294 | 9/1966 | Stanton et al. | 260/873 |
| 3,812,063 | 5/1974 | Kimura et al. | 260/9 |

*Primary Examiner*—Richard B. Turer
*Attorney, Agent, or Firm*—Cushman, Darby & Cushman

[57] ABSTRACT

A polyester elastomeric particle comprising a saturated elastomeric core, an intermediate layer covalently bound to the elastomeric core said intermediate layer comprising a condensation polymer of a dicarboxylic acid, a triol, and a diol wherein at least one of the components of the intermediate layer contains a tertiary hydrogen atom and an addition polymer surface layer grafted on to the intermediate layer wherein the elastomeric core is capable of absorbing not more than 150% w/w of xylene at ambient temperatures.

4 Claims, No Drawings

POLYESTER ELASTOMERIC PARTICLES

This invention relates to elastomeric particles.

Many of the polymeric materials used as mouldings or as film-forming components are inherently hard, with a glass transition temperature well in excess of ambient temperature, which are desirable features when related to their end uses. However, they also tend to be relatively inflexible and deficient in other mechanical properties such as impact strength and their utility is limited accordingly.

Various proposals have been made to strike a more acceptable balance between these conflicting characteristics by, for example, blending the polymers with plasticisers or by embedding within a matrix of the principle polymer a second elastomeric polymer in the form of small discrete particles.

The use of polymer plasticisers is well-known and widely used but is not a universally acceptable technique for various reasons; for example, the amount of plasticiser required to impart a desired degree of flexibility frequently carries the penalty of unduly softening the polymer. The proposal to incorporate discrete elastomeric particles within the polymer matrix has met with a degree of success in that properties such as, for example, impact resistance, elongation to break, can be increased without significantly reducing desirable properties such as surface hardness and gloss.

It would appear that one source of the disappointing results associated with the use of some discrete elastomeric particles is their tendency, whilst under stress, to separate from the matrix polymer at the interface between the two polymers. This is not surprising since the two polymers, by their nature, have inherently different chemical and physical properties and hence usually little affinity for each other. Some up-grading of performance can be achieved by careful selection, based on the known characteristics of polymers, of the matrix and disperse polymer to achieve a better tolerance between them.

It has been found that the incorporation of unmodified elastomeric particles usually markedly deteriorates the physical properties of the glassy matrix polymer.

It has been proposed that some surface modification of the particles or some polymer active at the particle matrix interface is required to obtain the required reinforcement of glassy matrix polymers.

Therefore, in the past, homogeneous elastomeric particles having reactive sites have been surface modified.

The known methods for grafting polymeric materials onto elastomeric particles mostly involve the free radical addition polymerisation of a monomer in the presence of unsaturated elastomeric particles, for example, polybutadiene. In this case, polymerisation may occur throughout the particle with a consequent change in the physical properties of the elastomer. Alternatively, the grafting polymerisation may be confined to the surface of the particles if, for example, a water soluble free radical initiator is used in conjunction with polybutadiene dispersed in water.

These methods depend on starting with unsaturated elastomeric particles to achieve reasonable grafting levels of the modifying polymer onto the particle. These unsaturated elastomers can be a disadvantage where, for example, good resistance to ultraviolet radiation is required.

We have now found a novel surface modified elastomeric particle which does not suffer from the disadvantages of residual unsaturation.

Accordingly we provide a polyester elastomeric particle comprising a saturated elastomeric core, an intermediate layer covalently bound to the elastomeric core said intermediate layer comprising a condensation polymer of a dicarboxylic acid, a triol, and a diol wherein at least one of the components of the intermediate layer contains a tertiary hydrogen atom and an addition polymer surface layer grafted on to the intermediate layer wherein the elastomeric core is capable of absorbing not more than 150% w/w of xylene at ambient temperatures.

Preferably the inert core will not absorb more xylene than 75% w/w of the core.

The elastomeric core may be identical with the intermediate layer or the elastomeric core may comprise a polyester elastomeric material comprising a condensation polymer of a dicarboxylic acid, triol and a diol in which none of the components contain a tertiary hydrogen atom. Suitable diols and triols containing a tertiary hydrogen atom are for example glycerol, hexanetriols, 2,3-butanediol, 2,2,4-trimethylhexanediol, 2,4,4-trimethylhexanediol, cyclohexanedimethanol, 2-methyl-2,4-pentanediol, 3-methyl-2,4-pentanediol.

Suitable diacids containing a tertiary hydrogen atom are for example 2-methylsuccinic acid, 2,4,4-trimethyladipic acid/2,4,4-trimethyladipic acid, cyclohexane-1,2-dicarboxylic acid.

In general, an elastomeric core is a polymer whose primary glass transition temperature (Tg) i.e. the Tg of the dominant amorphous zones, is below the lowest ambient temperature to which the polymeric composition is likely to be subjected, say $-10°$ C. The Tg of the rubbery polymer, as it exists in the composition, may be determined by conventional methods such as dilatometry or differential thermal analysis; but it is important to make proper allowance for the well-known fact that the glass-rubber transition is rate dependent, and it is better to measure the transition temperature at the highest rate of mechanical deformation that is likely to be encountered by the composition under practical conditions of use. For example, in the case where the composition may be struck by flying stones, the transition temperature can be deduced from measurements of the dynamic elastic modulus of the composition over a suitable range of temperatures at a frequency of 1000 Hz.

In general, the rubbery polymer should have a large extension to break and should be of high elasticity; preferably, in relation to the matrix polymer its modulus of elasticity should be at least an order of magnitude less than that of the matrix and its extension to break should be at least an order of magnitude greater.

The above considerations for the elastomer refer to its properties in its final form in the matrix polymer so that if, for example, plasticizer is present and at least some of the plasticizer resides in the elastomer, then it is the plasticized elastomer which should meet the above requirements.

The degree of crosslinking is important as too little crosslinking gives elastomeric cores which are not inert as they have high solvent - swelling characteristics. Too much crosslinking will give a core having a Tg above ambient temperature. For any polymer system, the correct degree of crosslinking can be found by simple experiment by methods well known to those skilled in the art.

Thus, for example, in the preparation of the polyester elastomeric core the relative proportions of dicarboxylic acid, triol and diol in the inert polyester core are not narrowly critical except that sufficient triol must be present to crosslink the polyester to prevent excessive swelling in solvent as hereinbefore described and the amount of triol must not be so great that the core loses its elastomeric properties. We have found for example that satisfactory polyester cores may be prepared when the molar ratio of glycerol to adipic acid is in the range from 66 : 100 24 : 100 and enough glycol e.g. diethylene glycol is used to give a moderate excess over that required to react with the adipic acid not required for reaction with the triol.

We also provide a process for preparing the elastomeric particles of our invention, said process comprising a modified dispersion polymerisation technique wherein a suspension of core particles is prepared by dispersion polymerisation of a first mixture and wherein said suspension of core particles is further treated with a second mixture to form an intermediate layer on the core particles and wherein the second mixture comprises a diol, a triol, and a diacid one of which contains a tertiary hydrogen atom: a surface layer of addition polymer is grafted onto the intermediate layer by radiation initiated free radical polymerisation.

The first mixture may also optionally contain a component such as glycerol containing a tertiary hydrogen atom.

For example, in the dispersion polymerisation of saturated polyester elastomer particles from adipic acid, glycerol or trimethylolpropane and diethylene glycol in which the co-reactants are drip-fed into petrol containing an appropriate surfactant, a further group containing a tertiary hydrogen atom may be introduced into the intermediate regions of the particle by the addition of 2,3-butanediol in the latter stages of the feed.

Suitable radiation for the free radical grafting of material containing a tertiary hydrogen atom has a wavelength of less than 100 Angstrom, in particular gamma-and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49 – 56; these include neutrons, accelerated heavy particles and X-rays or mixtures of them. A convenient practical source of high energy radiation is a Cobalt 60 source.

The dose rate of irradiation controls the rate of initiation of the polymerisation, but has little effect on the properties of the polymer formed. Dose rates between 10 rads/hr and 5 megarads/hr are operative and rates between 20,000 rads/hr and 1 megarad/hr are convenient in practice.

When elastomeric particles containing tertiary hydrogen atoms throughout the particle are used and therefore where free radical formation could occur throughout the particle, special techniques must be employed to ensure that the surface graft occurs. These special techniques include for example:

1. pre-irradiation of the particles in the absence of monomer,
2. reaction in the gas phase or alternatively the use of monomers which are not soluble in the elastomeric particle,
3. use of a non-solvent for the grafted polymer as a reaction medium,
4. the use of high radiation dose rates e.g. dosage levels of from 100,000 to 300,000 rds/hr.,
5. a combination of two or more of these techniques.

The choice of a surface polymer to meet the adhesive requirements may be guided by a consideration of the solubility parameters of the surface and matrix polymers. For example, chain entanglement is possible if the surface and matrix polymers are compatible. As a general rule, polymers are compatible if the mid-points of their solubility parameter ranges agree within one unit. If the surface and film-forming polymers are essentially incompatible, then they may be made compatible by generating sufficient adhesive forces between strongly interacting groups in the surface and the matrix polymers. For example carboxyl/amine or carboxyl/hydroxyl or nitrile/nitrile groups may be used. In some cases it may be possible to obtain a strong bond between the surface polymer and matrix polymer by having coreactable groups in the respective polymers. For example, the surface polymer may contain hydroxyl groups and the matrix polymer may contain epoxide groups or vice versa. As further examples, the polymers may contain the following coreactable groups: epoxide-carboxyl; carboxyl-hydroxyl; hydroxyl-isocyanate; isocyanate-primary or secondary amine.

As a further guide to the suitability of the surface polymer, the final composite material may be tested by breaking the composite and microscopically examining the fractured surface. If the dispersed elastomeric particles are fractured, then the bond between the surface polymer and matrix polymer is adequate. If a large percentage of elastomeric beads are pulled out of the matrix leaving complementary recesses, then the physical properties of the composite can be improved with the choice of a more suitable polymer using the criteria outlined above.

The surface modified particles are embedded in the polymer matrix by known means, bearing in mind that the completely fabricated polymer may be in the form of, for example, a sheet, moulding or surface coating film. The particles are typically 0.01 – 10 micron diameter, but where the particles are to be used in paint films, particles of 0.1 – 1 micron are preferred. In general, the maximum diameter will be determined by the thickness of the solid film laid down from the compositions and usually will not be greater than one tenth of this thickness. Where the particles are to be used in moulding applications particles of much greater diameters can be utilized.

The surface modified particles may be used in plastic mouldings, extrusions, films, fibres, or in paint films. In all cases, it is advantageous for the particles to be well dispersed in the final composite material. This should be considered when choosing a procedure for incorporating the particles into the matrix polymer. If the particles are to be used in bulk plastics, it may be convenient to add the surface modified particles in the form of a dry powder. If, on drying, the particles irreversibly coalesce, it is necessary to add the particles in the form of a slurry to the matrix polymer and then evaporate off the continuous liquid phase of the slurry.

In general, since the modifying surface polymer usually has a Tg above room temperature, the tendency of the particles to irreversibly coalesce is dependent on the polymer grafted onto the particles. Increased levels of grafting should result in a decreased tendency to irreversibly coalesce.

Similar considerations apply to the use of the particles in paints. However, in this case it is usually easier than for incorporation into plastics, since the particles may be added to the paint in the form of a liquid dispersion.

In non-plasticized compositions the elastomer particles may be present in a proportion of from 5 – 70% by volume of the matrix polymer. When plasticiser is present, the lower proportions of elastomer particles may be used, but from 20 – 50% by volume is a more usual proportion. Where the higher proportions of 50 – 70% by volume are required, this can be achieved by using a mixture of sizes of elastomer particles in order to increase the degree of packing.

The invention may be applied to coating compositions in which the major film-forming material is e.g. an alkyd resin, an epoxy resin, a cellulose derivative, a linear condensation polymer such as a polyamide or polyester, a vinyl resin such as polystyrene or polyvinyl chloride, or an acrylic resin such as polymethyl methacrylate. The film-forming material also may comprise a monomeric or oligomeric material which is polymerised or cured on the substrate being coated to form the solid film, such as low molecular weight amine formaldehyde, phenol formaldehyde, epoxy and polyester condensates. The film-forming material may be present in the coating composition partly or wholly in monomeric form and the liquid continuous phase may be provided by a liquid monomer optionally containing another film-forming component in solution.

The liquid phase may comprise an appropriate volatile liquid which may be evaporated on use of the composition, the liquid containing a solid or liquid film-forming material dissolved or dispersed therein. Alternatively, the liquid may be a crosslinkable or polymerisable liquid which may itself provide some or all of the film-forming material of the composition.

The invention is particularly useful when applied to coating compositions in which the film-forming material is to be crosslinked on the coated surface. The objective of crosslinking is to produce hard, durable films and the tendency of such films to be particularly brittle can effectively be modified by the incorporation of rubbery particles as described above.

The invention is now, illustrated by, but by no means limited to, the following examples in which all parts are parts by weight unless otherwise stated.

EXAMPLE 1

In this example, a saturated inert polyester elastomer bead is prepared which shows enhanced activity towards gamma-radiation grafting.

A mixture of petroleum ether b.p. 180° – 210° C (130 parts), graft copolymer emulsifying agent solution (30 parts) was placed in a 1 liter flange flask fitted with an anchor stirrer, a Dean-Stark trap, condenser, nitrogen inlet and a steam-jacketed dropping funnel.

The mixture was heated under reflux with rapid stirring in a nitrogen atmosphere. A hot mixture of adipic acid (131.5 parts), 2,3-butanediol (36 parts), trimethylolpropane (53.6 parts), methanol (118 parts) and water (50 parts) were added to the refluxing mixture over 1 hour. A mixture of p-toluenesulphonic acid (1 part) in water (5 parts) was then added, and the entire mixture refluxed for a further 3 hours, removing the volatile solvents via the trap. A 60% dispersion of elastomeric beads was obtained having particles in the size range 1 – 5 microns.

EXAMPLE 2

This example illustrates the preparation of a polyester elastomeric bead comprising a surface layer surrounding a completely saturated, inert polyester core.

To a refluxing mixture of a petroleum ether b.p. 180° – 210° C (145 parts) and graft copolymer emulsifying agent solution (32.4 parts) was added to a hot solution of adipic acid (119.3 parts), triethyleneglycol (55.3 parts), trimethylolpropane (49.4 parts), methanol (120 parts) and water (60 parts). After refluxing for 45 minutes, there was added a further hot feed of adipic acid (21.3 parts), 2,3-butanediol (5.9 parts), glycerol (5.9 parts), methanol (24 parts) and water (20 parts). This was followed immediately by a feed of p-toluenesulphonic acid (0.5 parts) in water (5 parts), and reflux was continued for a further 3 hours. The beads thus formed were in the size range 2–4 microns. Solids were 60%.

EXAMPLE 3

This example illustrates the use of another diol containing potentially active tertiary positions.

Example 2 is repeated replacing 2,3-butanediol with 2-methyl-2,4-pentanediol (hexylene glycol) (7.7 parts). The resulting dispersion contained particles in the size range 1–5 microns.

EXAMPLE 4

The diol used in this example has three potentially active positions. Example 2 is repeated replacing 2,3-butanediol with 3-methyl-2,4-pentanediol (7.7 parts). Particle size is in the range 1–7 microns.

EXAMPLE 5

This example illustrates the use of another reactive triol. Example 2 is repeated replacing the glycerol with hexanetriol (8.6 parts). A 60% dispersion of polyester beads (2–7 microns) was obtained.

EXAMPLE 6

This example uses a commercial dicarboxylic acid mixture containing reactive sites. Example 2 is repeated replacing the adipic acid/2,3-butanediol/glycerol portion with 2,2,4-/2,4,4-trimethyladipic acid (40/60 ratio) (27.5 parts), diethylene glycol (7.0 parts), glycerol (5.9 parts), methanol (30 parts) and water (25 parts). A 60% dispersion of elastomeric beads in the range 0.5–5 microns was obtained.

EXAMPLE 7

This example demonstrates the grafting of an acrylic monomer onto completely saturated beads.

A 60% solids dispersion (68 parts) of the elastomeric particles prepared in Example 2 was mixed with petroleum ether b.p. 60° – 80° C (290 parts) and methyl methacrylate (60 parts). The well-stirred mixture was irradiated using a Cobalt 60 source at a dose rate of 0.3 Mrads/hour for 190 minutes, and the grafting efficiency was 43%. Ethoxyethyl acetate (200 parts) was aded and the petroleum ether removed.

EXAMPLE 8

Example 7 was repeated replacing the 60% dispersion of example 2 with the 60% dispersion of example 3.

EXAMPLE 9

Example 7 was repeated replacing the 60% dispersion of example 2 with the 60% dispersion of example 4.

EXAMPLE 10

Example 7 was repeated replacing the 60% dispersion of example 2 with the 60% dispersion of example 5.

EXAMPLE 11

Example 7 was repeated replacing the 60% dispersion of example 2 with the 60% dispersion of example 6.

EXAMPLE 12

The following table illustrates the advantages produced by the introduction of the grafted surfacemodified beads of example 7–11 into a polymethyl methacrylate matrix system.

Test samples were prepared by adding an ethoxyethyl acetate dispersion of the grafted particles, prepared in example 7–11 to the acrylic matrix in the required concentrations, then making the samples up to the same solids content with solvent. Glass panels (8 inches × 4 inches) were coated with 2.5% aqueous methyl cellulose, 15 cps, then baked for 1 hour at 150° C. The test films were drawn down with a 250 micron blade, airdried for 15 minutes, then baked for 30 minutes at 130° C. The test films were removed from the glass panels by soaking them in water for 10 minutes. Test strips (5 cm × 2 cm) were cut from the sheet, without edge flaws using a warm scalpel blade, and the resulting strips tested on an Instron Tensile Tester (Registered Trade Mark).

The following table illustrates the advantages produced by the introduction of the grafted surface-modified particles.

The graft copolymer emulsifying agent used in Examples 1–6 was a free-radical copolymerization product of the glycidyl methacrylate ester of the self polyester of 12-hydroxystearic acid, methyl methacrylate and methacrylic acid. The emulsifying agent solution was a 64 percent solids solution of this copolymer in butyl acetate.

I claim:

1. A polyester elastomeric particle comprising a saturated elastomeric core comprising a condensation polymer of a dicarboxylic acid, a triol and a diol wherein no component contains a tertiary hydrogen atom, a tertiary hydrogen atom being a hydrogen atom attached to a carbon atom to which no other hydrogen atom is bonded, an intermediate layer covalently bound to the elastomeric core, said intermediate layer comprising a condensation polymer of a dicarboxylic acid, a triol, and a diol wherein at least one of the components of the intermediate layer contains a tertiary hydrogen atom and an addition polymer surface layer of methyl methacrylate grafted on to the intermediate layer wherein the elastomeric core is capable of absorbing not more than 150% w/w of xylene at ambient temperatures, the polyester elastomeric particle being in the size range from 0.01 to 10 microns in diameter.

2. An elastomeric particle according to claim 1 wherein the inert core is capable of absorbing not more xylene than 75% w/w of the core.

3. An elastomeric particle according to claim 1 wherein the component of the intermediate layer containing a tertiary hydrogen atom is chosen from the group consisting of glycerol, hexanetriols, 2,3-butanediol, 2,2,4-trimethylhexanediol, 2,4,4-trimethylhexanediol, cyclohexanedimethanol, 2-methyl-2,4-pentanediol, 3-methyl-2,4-pentanediol, 2-methylsuccinic acid, 2,2,4-trimethyladipic acid, 2,4,4-trimethyladipic acid and cyclohexane-1,2-dicarboxylic acid.

4. An elastomeric particle according to claim 1 wherein said dicarboxylic acid is adipic acid and said triol is glycerol and further wherein the molar ratio of glycerol to adpic acid is in the range from 66 : 100 to 24 : 100 and enough glycol is used to give a moderate excess over that required to react with the adipic acid not required for reaction with the triol.

* * * * *

| No of Example in which grafted beads were prepared | Matrix System | Grafted beads (percent) | BBP* (percent) | Hardness (Knoop) | Yield Strength (Kg cm$^{-2}$) | Elongation (percent) |
|---|---|---|---|---|---|---|
| — | 40% polymethyl methacrylate in 70/30 toluene/ acetone | 0 | 0 | 22.0 | 350 | 4.0 |
| — | '' | 0 | 20 | 8.8 | 170 | 11.0 |
| 7 | '' | 30 | 0 | 15.3 | 308 | 11.0 |
| 7 | '' | 30 | 12 | 8.6 | 263 | 16.0 |
| 7 | '' | 30 | 20 | 6.0 | 125 | 22.0 |
| 8 | '' | 30 | 0 | 12.0 | 278 | 12.5 |
| 9 | '' | 30 | 0 | 15.5 | 290 | 10.0 |
| 10 | '' | 30 | 0 | 13.0 | 283 | 12.0 |
| 11 | '' | 30 | 0 | 15.6 | 302 | 10.5 |

*Butyl benzyl phthalate